June 17, 1958  W. J. MOLLNER  2,839,153
GAS CLEANING APPARATUS
Filed Oct. 2, 1956  3 Sheets-Sheet 1

INVENTOR.
WILLIAM J. MOLLNER.
BY
Christy, Parmelee & Strickland
ATTORNEYS.

June 17, 1958  W. J. MOLLNER  2,839,153
GAS CLEANING APPARATUS
Filed Oct. 2, 1956  3 Sheets-Sheet 2

INVENTOR.
WILLIAM J. MOLLNER.
BY
ATTORNEYS.

June 17, 1958 W. J. MOLLNER 2,839,153
GAS CLEANING APPARATUS
Filed Oct. 2, 1956 3 Sheets-Sheet 3
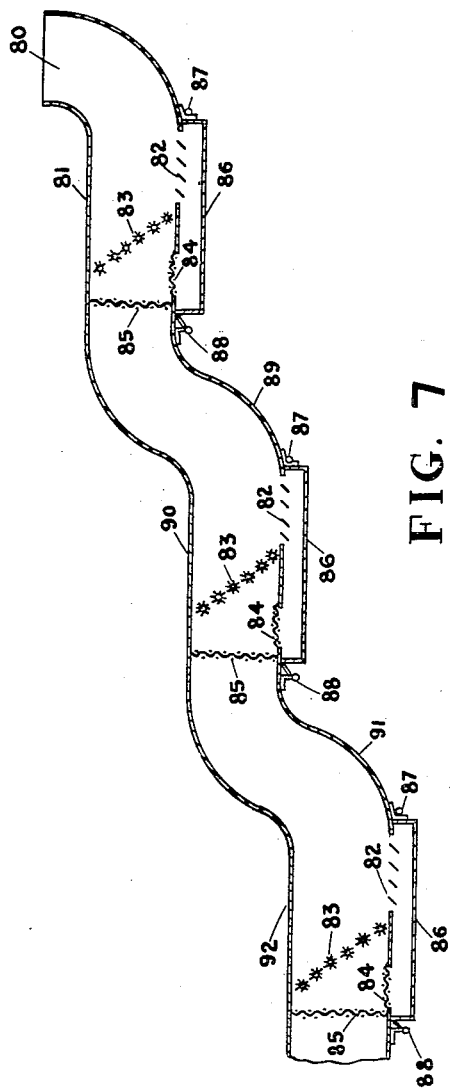
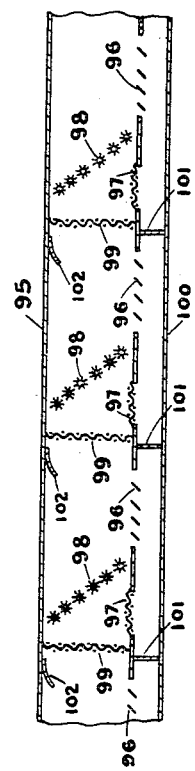
INVENTOR.
William J. Mollner
BY

United States Patent Office 2,839,153
Patented June 17, 1958

2,839,153

GAS CLEANING APPARATUS

William J. Mollner, Pittsburgh, Pa.

Application October 2, 1956, Serial No. 613,586

15 Claims. (Cl. 183—13)

This invention relates to gas cleaning apparatus. More particularly the invention relates to an apparatus for removing finely divided solids such as dust, flue dust, and other contaminants from air or other gases. This is a continuation-in-part of my application Serial No. 390,931, filed November 3, 1953 now abandoned.

Common methods of cleaning gases, both industrial and for air in household heating systems, involve either the use of fine mesh filters of some type, or high voltage electric precipitation. Household heating systems, for example, are quite commonly fitted with removable screens containing oil treated fiber, or Fiberglas, or fine mesh cloth, but they quickly become clogged and impair the circulation of air through the heating system and reduce the efficiency of the heater.

Conventional electric precipitators, on the other hand, while more efficient in removing very fine particles, require expensive electrical equipment, and for large volumes of air or gas they require considerable space, and the current consumption is no inconsiderable factor in their operation.

According to the present invention there is provided a gas cleaning apparatus utilizing certain new pronciples, and which I have found effective not only for the removal of dust from atmospheric air and therefore satisfactory for use in home heating systems, but which will also remove smoke particles, soot and finely divided solids from waste gases, flue gases and the like.

A primary object of my invention is to provide a gas cleaning apparatus for either domestic or industrial use which requires neither the use of filters nor electrical equipment, and which may be operated for long periods of time without becoming clogged as do filters, and in which the precipitation is effected through natural phenomenon requiring no electrical equipment.

A further object of the invention is to provide an air cleaning method and apparatus in which the flow of gases through the apparatus is conducive to the precipitation of finely divided solids.

A further object of my invention is to provide a gas cleaning apparatus which may incidentally humidify the gas being treated, or which, when used with hot furnace gases, will cool the gases and also cool the apparatus itself.

With these and other objects in view, the invention consists in the improved gas cleaning apparatus hereinafter illustrated and described and particularly defined in the appended claims. The various features of the invention are illustrated in the accompanying drawings, in which:

Fig. 7 is a more or less diagrammatic view showing another embodiment of my invention, the view being a longitudinal vertical section; and Fig. 8 is a view similar to Fig. 7 showing a still further embodiment.

The gas cleaning unit shown in the accompanying drawings (Figs. 1 to 6) is especially designed and adapted for incorporation in a household heating system wherein air is drawn from a duct leading to one or more of the rooms of the house, and is discharged into the air heating space of the furnace. However, the unit as shown is also adapted for inclusion in flues or other systems for conducting flue or other industrial gases from a combustion apparatus to a point of discharge, or for any other purpose where gas containing solids is to be cleaned.

Figure 1:
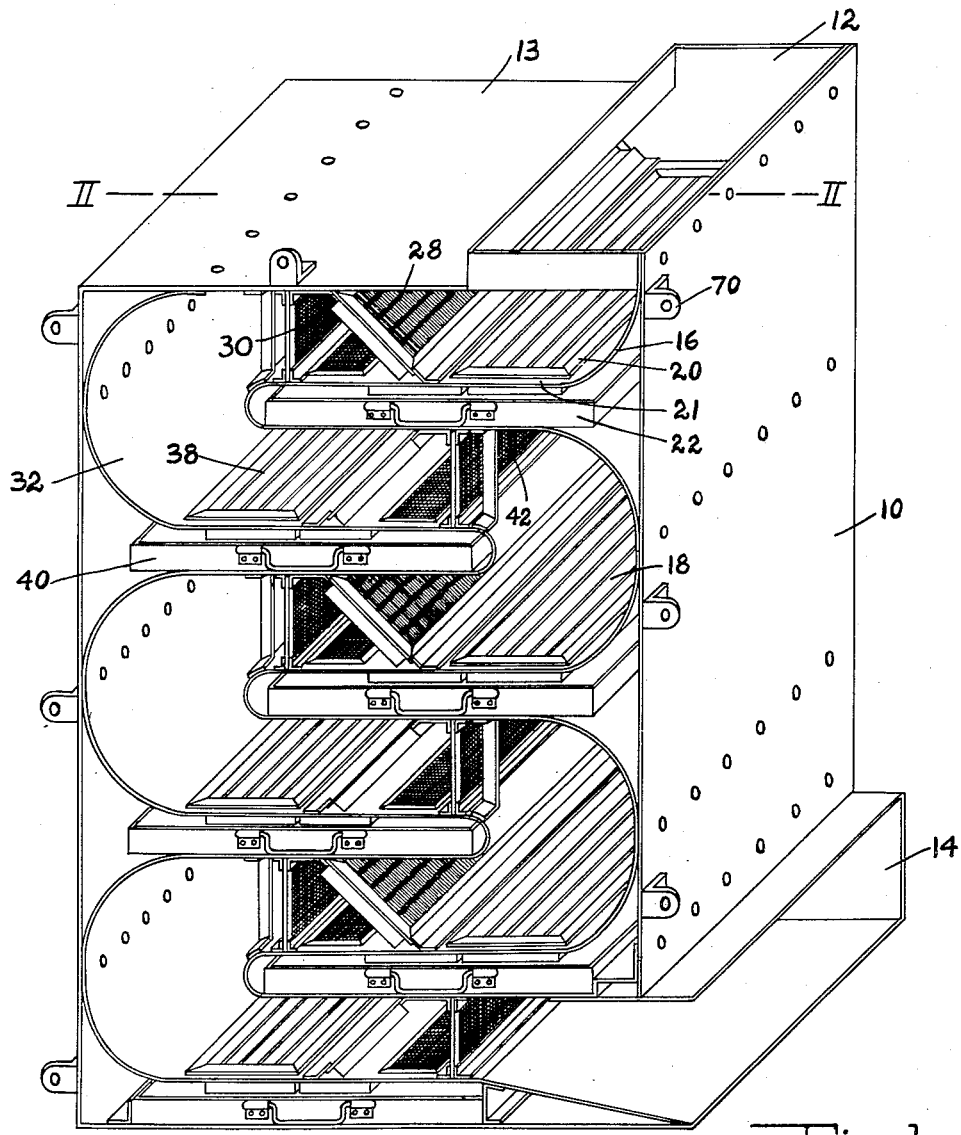
Fig. 1 is a view in perspective of an apparatus embodying my invention, one of the side cover plates being removed for the purpose of illustrating the interior construction.
Figure 2:
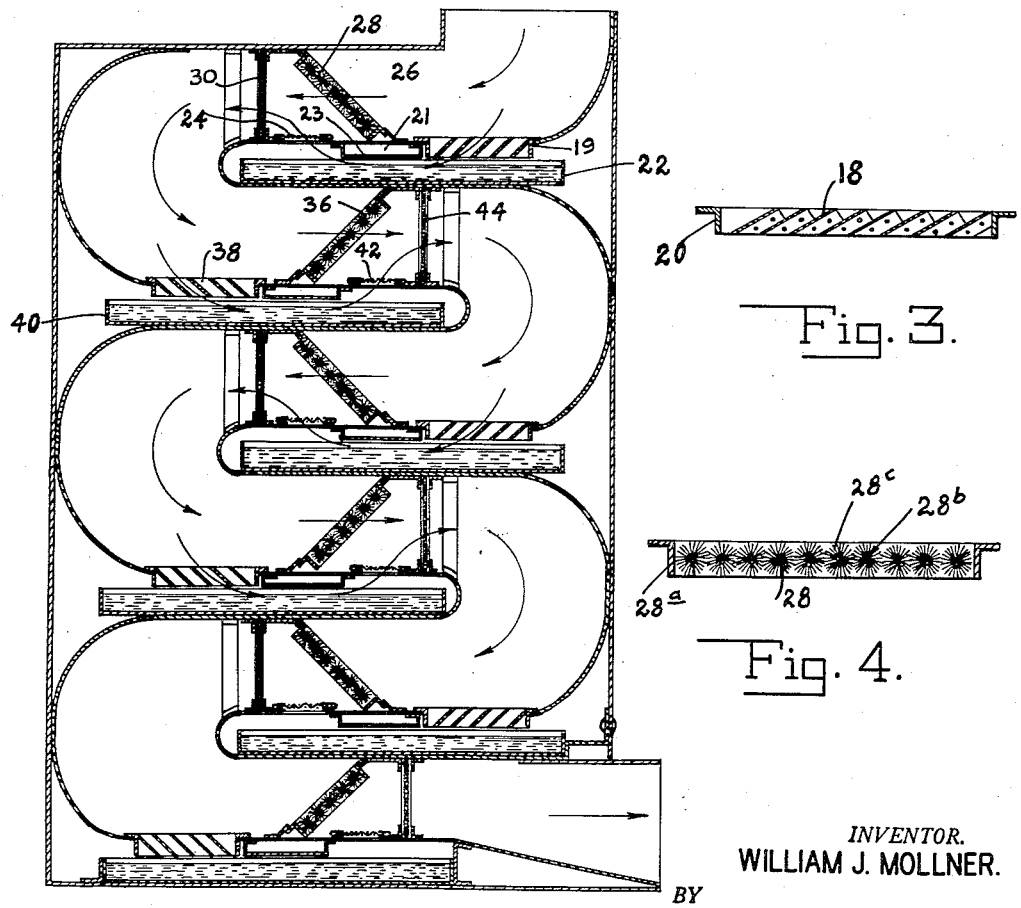
Fig. 2 is a vertical sectional view through the apparatus in substantially the plane of line II—II of Fig. 1.
Figure 3:
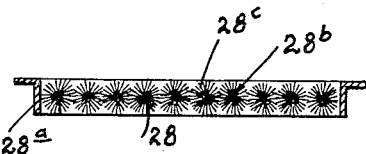
Fig. 3 is a transverse vertical sectional view through one of the louvre frames.

Referring more particularly to Figs. 1 and 2, the unit consists of a casing 10 which houses a succession of similar gas treating sections connected in series. The housing has an air or gas inlet 12 across the top 13 thereof, and a gas outlet 14 at the bottom. Ducts (not shown) may be connected to the inlet 12 and to the outlet 14 so that air or gas to be treated may be induced to flow through the unit. Leading downwardly from the inlet opening 12 is a curved baffle 16 against which the entering gases immediately impinge, and by means of which the path of flow is diverted. Plate 16 extends from one side wall of the casing to the other, so that all of the air entering the casing is deflected in the same manner. At the base of the curved baffle 16 there are a series of louvres 18 supported in a frame 20, which may be a continuation of baffle 16. The frame 20 is set over an opening 19 in a horizontal plate 21. These louvres deflect a portion of the gas being processed through the opening 19 into a pan 22 provided under the plate 21. This pan 22 is removable horizontally through the side of the casing when the side cover plate is removed as shown in Fig. 1. The pan may contain a shallow bath of oil or water as shown in the drawings.

In the plate 21 over another area of the pan spaced from the louvres 18 there is another opening which is covered by a coarse screen 24 so that the gas which is deflected through the louvres 18 flows over the surface of the oil in the pan and may escape through the screen 24. A baffle 23 may be positioned under the plate 21 between the louvres and the screen 24 so as to narrow the passageway above the surface of the liquid in the pan 22.

While part of the gas being treated is thus forced through the louvres and escapes upwardly through the screen 24, another portion of the gas being treated travels horizontally above the top of the plate 21. In the passageway 26 which is located between the plate 21 and the top of the casing, there is set a frame 28 which preferably is set at a sloping angle across the passage 26. This frame, which is hereinafter more fully described in detail, has its central area covered with metal bristles or spines, like those for instance, of a wire brush, projecting in various directions, through which the gases pass. After passing through the bristles, the gas which is flowing horizontally meets the gases that are flowing vertically through the screen or collector 24, creating a zone of violent agitation. Extending transversely across the passageway 26 rearwardly of the frame 28 is a coarse screen 30, the screen 30 being beyond the zone of agitation where the two streams of gases first mix.

Beyond the passageway 26 at the opposite wall of the casing from the baffle 16 is a similarly curved baffle 32, so that after the gases pass through the screen 30 they contact the baffle 32 and then pass through another unit which includes louvres 38, corresponding to the louvres 18; a pan 40, corresponding to the pan 22; screen 42, corresponding to screen 24; frame 36, corresponding to frame 28; and screen 44, corresponding to screen 30. Thereafter there may be any number of similar units providing a sinusoidal path for the flow of gases from the top to the bottom of the casing, the gas in each horizontal pass across the casing being divided so that part of it flows through louvres and over a pan, and part of it flows through a horizontal passage above the pan. The final horizontal passage at the bottom of the casing leads to the discharge opening 14.

While the reason for the successful operation of the apparatus in precipitating fine particles is somewhat speculative, it appears that when the gases are deflected from their straight line travel by the curved baffle 16 and the subsequent baffles 32, the heavier particles tend to move in a straight line and pass directly through the louvres 18 into one of the pans where they are wet by the liquid within the pan and retained. The very finely divided solids, being carried through the wire bristles in the frame 28, appear to accumulate a static charge which is sufficient to attract smaller particles in the gases rising upwardly through the screen 24, or its counterpart in succeeding units, causing them to collect together into larger solid masses, and this action appears to be promoted by the screen 30, so that the larger particles thus formed then carry over and fall through the louvres in the succeeding pass. By repetition of this process, the gases are effectively cleaned, and I have found for example, that air heavily laden with soot, as, for instance, a smoke resulting from the burning of tar paper, will be quite effectively cleaned by the time the discharge is reached, and standard tests made with filter paper on the entering and exit gases show a relatively high efficiency for the apparatus.

After the machine has been operated for a period of time, it has been found that compared with the amount of dust which is accumulated in the succession of pans, the amount of dust retained in the bristles in the frames 28 or 36 is negligible, so that while there is necessarily some entrainment of dirt particles in these bristles, the vast majority of particles which would be large enough to be trapped on the bristles have evidently been deflected through the louvres, and the bristles do not function as filters in the sense that they hold back and strain out the solids. Their function appears to be merely that of causing the fine dust particles to agglomerate in the manner above described. The screens 24 and 30 are desirably made of a mesh of a quarter of an inch or somewhat larger, so that they also do not act as filters to strain out the particles, and hence do not become clogged. Even after operation for many hours, there is no appreciable accumulation of dust on the bristles or on the screens.

Assuming the apparatus shown in the drawings to be approximately five feet high and thirty inches wide, and using a suction fan on the outlet side of the system capable of moving four thousand cubic feet of air per minute, I have found that if I discharge large quantities of flour which have been well dried, practically none of the flour will pass through the unit even at the high velocity of four thousand cubic feet per minute, and that save for a few particles that may adhere to the metal surfaces in the first one, two or three passes, very little of the flour will be in evidence on the bristles or on the screens, practically all of it being trapped in the successive trays. As a matter of fact the apparatus appears to operate just as effectively when there are large quantities of dust present in the air, as when ambient air taken from the room of a house is processed.

In the apparatus shown in the drawings, there are six successive treating passes, and six pans for the collection and removal of dust, but the number of passes provided may be varied according to the nature of the contaminants, the volume and velocity of air, and other factors. Also for domestic purposes I may use oil in all of the pans except the last one, in which water may be provided, the water not only serving to trap the fine residuum of the solids, but it also may provide humidity for the air in a hot air heating system, and it is also of course evident that cooling coils may be incorporated in the passageway near the discharge, should the unit be used for air-conditioning, as well as for air cleaning.

I have heretofore observed that in many places, as for example in woodworking establishments, very fine particles of wood dust will collect on certain surfaces, while on other surfaces apparently exposed to similar conditions, there will be no collection of dust. This apparently is due to some electrostatic effect, and it is also a matter of common observation that dust particles will collect and gather to go under certain articles of furniture, as for example the bed having metal springs, much more rapidly than under other pieces of furniture where there may be an equally favorable environment for the settlement of dust, and this again would appear to result from electrostatic phenomenon. In the present apparatus I believe that I have succeeded in utilizing this phenomenon, but much more effectively, and it is to this that I attribute to a large measure the successful operation of the unit, and the fact that while the wire bristles in the collector 28 or the collectors 36 themselves do not retain any appreciable amount of dust, they do appear to cause the tiny dust particles to collect and agglomerate, rendering them amenable to capture in passing through the subsequent louvres.

Figure 5:
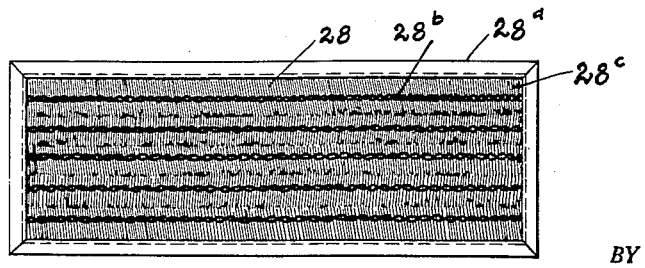
Fig. 5 is a front elevation of one of the collector elements having bristles thereon.
Figure 4:
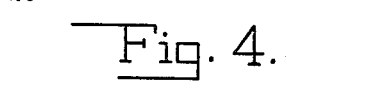
Fig. 4 is a transverse vertical section through a collector element constituting a part of the apparatus.

The frame 28 shown in Figs. 4 and 5 has a surrounding annular supporting frame 28a with side strips and end pieces. Wires with bristles twisted between them extend lengthwise of this frame, these wires being designated 28b, and the bristles themselves are designated 28c. The bristles are quite close together and extend in every direction, as best shown in Fig. 4, so that the gases which pass therethrough are apt to be brought into intimate contact with the bristles. This brings the dust particles into proximity to the bristles, but as previously indicated there is little dust retained in the bristles themselves, even after a sustained period of operation. The frames or collectors 36 are similar in all respects to the frame or collector 28. By being inclined across the passageway, a relatively large collector area can be provided in a relatively small vertical space.

Figure 6:
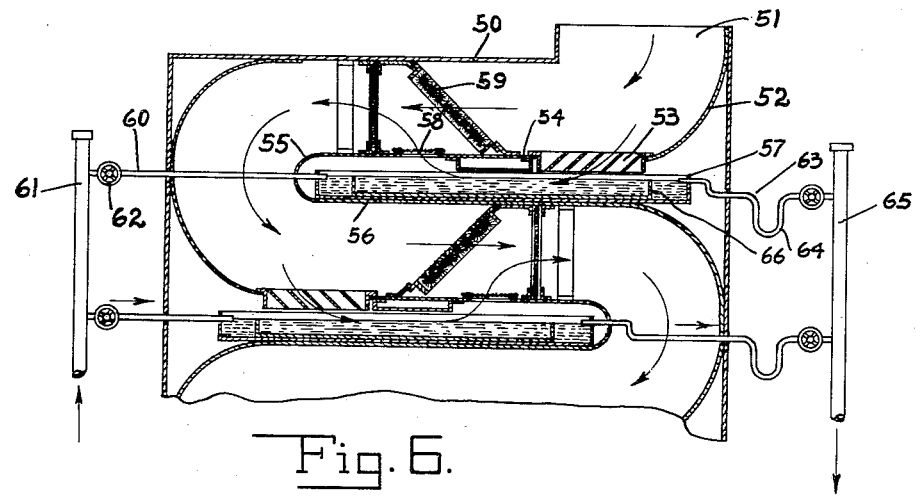
Fig. 6 is a view similar to Fig. 2 showing a modified arrangement for the treatment of industrial gases wherein provision is made for the continuous circulation of water through the collecting pans, both for cooling the apparatus and for carrying away fine particles.

In industrial operations it may be desirable to continuously flow water or other liquid through the dust collecting pans, and provision may be made for this as shown in Fig. 6. Here the dust collector is similar in all respects to that previously described, there being a casing 50 with an air inlet passage 51 across the top thereof. There is a curved baffle 52 at the base of which is a louvre 53, this louvre being set in a horizontal plate 54 that forms a continuation of the plate 52, and which in turn is looped around at 55 to form an under plate 56 constituting the top of the next horizontal passage, and forming a support for a fixed pan 57. Through the plate 51 at a point removed from the louvres 53 is a screen 58, and a collector 59 similar to the collector 28 is inclined across the passageway above the plate 51 and below the top 50 of the casing. As stated, the general construction is just like that previously described, except that there is a fixed pan 57 under the louvres, and water or other liquid can be supplied thereto through a pipe 60 leading from a supply manifold 61, the rate of flow being controlled by some valve means, as for example a manual valve 62. A drain pipe 63 having a trap 64 leads from the pan 57 to a discharge manifold 65, so that water may always circulate through the pan, and the rate of withdrawal can be regulated. Set in the pan 57 is a shallower removable pan 66 which can from time to time be removed, as it is in this pan that most of the heavier particles that will not be carried off by the water will accumulate. It is not, however, necessary that this shallower pan be provided.

The single unit herein described is duplicated one or more times below the first in the manner hereinbefore described, so that the gas being treated follows a sinuous path from the top to the bottom, and in each reversal of horizontal flow, it traverses another similar treating unit.

As shown in Fig. 1, the casing may be provided with a plurality of lugs 70 to permit a flat side plate to be sealed against the open side of the casing, the removable side plate affording access to the interior for removal of the pans from time to time, and it will of course be apparent that the structure within the casing must abut against the side plate in order to avoid the flow of incoming gas directly to the outlet without following the sinuous path through the several processing units.

While the structure hereinbefore described discloses a compact and effective unit, the principles of my invention may be utilized in other arrangements, as schematically disclosed in Figs. 7 and 8.

Referring first to Fig. 7, there is a duct, preferably of square or rectangular section, having an inlet 80 that opens into a straight reach 81. In the bottom of this duct near the forward end of the straight reach is an opening 82 in which louvres sloped toward the flow of gas are located. Intermediate the ends of the straight reach is a curtain of wire bristles 83 which may be constructed like the curtain 28 of Fig. 2, and which is preferably sloped to provide greater area. In the bottom of the duct rearwardly of the curtain 83 is a second opening 84 which is appreciably smaller in area than opening 82, being about half as wide as opening 82. Opening 84 is preferably covered with coarse screens, such as hardware screen, and back of this opening is a transverse screen 85 of coarse mesh similar to screen 30.

Under the straight reach, so as to form a chamber or duct from opening 82 to opening 84, is an enclosure 86 here shown as a pan hinged at 87 with a releasable catch 88 to hold the pan sealed against the bottom of the duct. This part of the duct beginning at 80 and ending just beyond screen 85 may be termed a unit. The duct is curved downwardly at 89 and there is a second unit of similar construction following this downward curve, this unit being designated generally as 90, and corresponding reference numerals designate corresponding parts. Unit 90 has a curved discharge portion 91 at the rear end opening into a third similar unit 92.

In this way there may be a succession of units which are functionally the same as the succession of units provided in Figs. 1 and 2. Three or more are generally used. Oil or water may be used in the pans 86, and the continuous flow arrangement of liquid shown in Fig. 6 may also be used with this arrangement, or the pans may be dry, as they may be in the other forms.

Air flowing into the forward end of each unit is partially obstructed by the wire bristle curtains 83 and some of the air flows through opening 82 into pan 86 where, because of outlet 84 being more restricted, there is a decrease of velocity, depositing dust in the pan. Air moving out through opening 84 has its velocity increased and crosses the air currents flowing through curtain 83. This appears, possibly because of electric charges produced in particles by passing through the bristles, to cause the smaller dust particles to brush together and pass into the next unit where the larger particles fall through the opening 82. This action is repeated in the several units.

Fig. 8 shows a somewhat similar arrangement except there is a straight line duct with a succession of units therein. In this figure, 95 is a straight square or rectangular duct. It has a plurality of larger openings 96 in the bottom at spaced intervals, and spaced from each of the larger openings is a smaller opening 97. Openings 96 may be provided with louvres and correspond to openings 82. Openings 97 correspond to openings 84 of Fig. 7. Sloped across the duct from top to bottom back of each opening 96 and in front of each opening 97 is bristle curtain 98. After each opening 97 is a coarse transverse wire screen 99. Under the main duct is an enclosure 100 with transverse partitions 101 therein, each partition being back of an opening 97. This enclosure may be made removable as a unit, or may have clean-out doors or drawers. It provides a succession of collecting chambers or pans under each unit. Liquid may be used in the pans as previously described, or they may operate dry.

Gas flows through the duct 95 in the direction of the arrows and the device may have as many units in succession as are desired. It functions in the manner described in connection with Fig. 7. If desired, curved baffles, indicated at 102, may be provided to the rear of each transverse screen 99, serving to aid in the deflection of heavier particles toward the opening 96 of the respective units.

While I have shown and described certain embodiments of my invention, and have expressed my theory in regard to the reasons for its successful operation, it will be understood that the structure of the device may be modified in various ways within the contemplation of my invention, and that I do not confine myself to the reasons or theory of operation herein advanced, and which has been developed as a consequence of my observations.

I claim:

1. Apparatus for removing finely divided solids from gases comprising a succession of similar units each comprising a duct-like passage having a gas entering end and a gas discharge end and having an opening in the bottom near each end thereof, a gas pervious curtain of bristles across the passage between said openings, and an enclosure under the passage forming a dust-receiving bypass through which some of the gas to be cleaned may flow from the opening at the gas entering end of the duct-like passage and return to the duct-like passage through the other opening at the discharge end of the duct-like passage to mingle with the gas which has passed through the curtain in preparation for entering the succeeding similar unit, and a movable closure for the said enclosure to provide for the removal of dust therefrom.

2. Apparatus for removing finely divided solids from gas as defined in claim 1 in which the bristles of said curtain are of metal.

3. Apparatus for removing finely divided solids from gas as defined in claim 1 in which the opening at the gas entering end of the passage is of larger area than the other one.

4. Apparatus for removing finely divided solids from gas as defined in claim 3 in which each unit is lower than the preceding one and the inlet end of the succeeding one is connected with the outlet end of the preceding one by a curved passage.

5. Gas cleaning apparatus comprising a casing having inlet and outlet openings at opposite ends thereof, baffle means providing a sinuous passageway from one opening to the other, said baffles defining a passageway including horizontal reaches positioned one above the other, there being curved passageways at opposite ends of each reach connecting it with the succeeding ones, the curved passage for the first horizontal passage leading to the inlet opening and the discharge end of the final passage leading to the outlet opening, each baffle which forms the bottom of a horizontal reach of the passageway having an opening therein at the forward end thereof in the direction of the gas flow and having a second opening near the rear end thereof, there being an imperforate area of said baffle between the first and second openings whereby some of the gas may leave the main stream at the forward end of each horizontal reach and pass through the first opening and return to the main stream through said second opening only at the remote end of said reach and dust collecting means under each reach below the level of the opening across which said diverted portion of the stream of gas flows.

6. A gas cleaning apparatus as defined in claim 5 wherein the dust collecting means comprises removable shallow pans adapted to contain fluid, said first openings having louvres for directing the diverted stream of gas into contact with the surface of the fluid in said pans, said pans being supported in the casing for sliding movement from under the baffles.

7. A gas cleaning apparatus as defined in claim 6 wherein one side of the casing is removable to afford access to the pans.

8. A gas celaning apparatus as defined in claim 6 wherein baffle means is provided above the pans between the first and second openings for deflecting the stream of gas downwardly into the pans and for increasing the velocity of the stream between the first and second openings.

9. A gas cleaning apparatus as defined in claim 6 having means for continuously flowing fluid through the pans to carry off collected dust.

10. A gas cleaning apparatus as defined in claim 6 having means for continuously flowing fluid through the pans to carry off collected dust, said last-named means including fluid supply pipes having valves for controlling the rate of fluid supply to the pans, and fluid drain pipes having traps to prevent the escape of gases.

11. A gas cleaning apparatus as defined in claim 5 in which each horizontal reach of the passage has the transverse area thereof between the first and second openings provided with finely-spaced metallic strands through which the main stream of the gas flows, and following which the diverted portion of the stream re-enters the main stream and creates a zone of turbulence.

12. A gas cleaning apparatus as defined in claim 5 in which each horizontal reach of the passage has the transverse area thereof between the first and second openings provided with finely-spaced metallic strands through which the main streams of the gas flows, and following which the diverted portion of the stream re-enters the main stream and creates a zone of turbulence, the finely-spaced metal strands comprising bristles radiating from wire supports, said wire supports being carried in a frame positioned in the horizontal passageway.

13. A gas cleaning apparatus comprising a casing, horizontal baffles in the casing defining a series of reversely-extending passageways therethrough with each passageway in turn opening into the next and so forming a continuous sinuous duct, a dust collecting chamber under each horizontal baffle, louvred openings at the forward end of each said horizontal baffle into which part only of the air stream is deflected into the chamber, the rear portion of each horizontal baffle having an opening therethrough through which air is discharged from the said chamber back into the passageway, and a frame across each passageway rearwardly of the louvred opening and forwardly of the last-named opening, said frame having brush-like metal bristles over its area through which only that part of the gas stream which is not deflected through the louvred openings flows.

14. A gas cleaning apparatus as defined in claim 13 wherein each chamber has a shallow pan thereunder across which the gas traveling from the louvred openings to the other opening must flow, said pans being removably supported in the casing.

15. A gas cleaning apparatus comprising a casing having inlet and outlet openings at opposite ends thereof, baffle means providing a sinuous passageway from one opening to the other, said baffle means defining a passageway including horizontal reaches positioned one above the other, there being curved passageways at opposite ends of each reach connecting it with the succeeding ones, the curved passage for the first horizontal reach leading to the inlet opening and the discharge end of the final reach leading to the outlet opening, each baffle which forms the bottom of a horizontal reach of the passageway having an opening therein at the forward end thereof in the direction of the gas flow and having a second opening near the rear end thereof whereby some of the gas may leave the main stream at the forward end of each horizontal reach and return to the main stream only at the remote end of said reach, dust-collecting means under each reach below the level of the openings across which said diverted portions of the stream of gas flow, means extending transversely of the area of each horizontal reach between the first and second openings provided with finely-spaced metallic strands through which the main stream of gas flows and following which the diverted portion of the stream re-enters the main stream and creates a zone of turbulence, and transverse coarse mesh screen across each horizontal reach of the passageway beyond the second opening through which all of the gas flows, said screen being of a mesh such that it does not obstruct the solid particles to be removed from the gas stream.

References Cited in the file of this patent

UNITED STATES PATENTS

| 1,593,965 | Cobb | July 27, 1926 |
|---|---|---|
| 1,761,014 | Hendrickson et al. | June 3, 1930 |
| 1,914,681 | Cartmell | June 30, 1933 |
| 1,918,531 | Gentry | July 18, 1933 |
| 2,306,192 | Spiselman et al. | Dec. 22, 1942 |

FOREIGN PATENTS

| 58,659 | Switzerland | Jan. 29, 1912 |
|---|---|---|
| 768,742 | France | May 28, 1934 |